J. JACOBSON.

IRIDESCENT STONE OR BODY.

No. 11,263. Reissued Aug. 16, 1892.

WITNESSES.

L. Henry Marsh.

S. C. Fearing.

INVENTOR.

John Jacobson

By Jas. H. Churchill

Atty.

UNITED STATES PATENT OFFICE.

JOHN JACOBSON, OF BOSTON, MASSACHUSETTS.

IRIDESCENT STONE OR BODY.

SPECIFICATION forming part of Reissued Letters Patent No. 11,263, dated August 16, 1892.

Original No. 467,579, dated January 26, 1892. Application for reissue filed March 31, 1892. Serial No. 427,302.

*To all whom it may concern:*

Be it known that I, JOHN JACOBSON, residing in Boston, county of Suffolk, and State of Massachusetts, have invented an Improvement in Iridescent Stones or Bodies, of which the following description, in connection with the accompanying drawings, is a specification, like letters on the drawings representing like parts.

This invention has for its object the production of an iridescent stone or body having one or more faceted surfaces provided with substantially infinitesimal lines, whereby the said body, when exposed to the light, has an iridescent appearance.

Prior to my present invention I am aware that stones or jewels of glass, paste, or like material have been provided with facets to approximate the appearance of the diamond; but such bodies have been devoid of the iridescent colors characteristic of the diamond.

In accordance with my present invention I have ascertained that a body or article composed of glass, paste, or like material may have imparted to it the iridescent colors possessed by the fine qualities of diamond by providing some or all of the facets with very fine or substantially infinitesimal lines, which may run parallel or at an angle to one another and which are equidistant apart and of uniform thickness relative to each other. In order to produce the desired iridescence, the facets are provided with a substantially large number of lines, and for the best results I prefer to provide the facets with from ten thousand and upward per square inch. The faceted body, when made of glass or like transparent and vitreous material, is molded in a plastic state into the shape desired—as, for instance, into the form or shape of a jewel or stone. This may be accomplished by subjecting the plastic material to pressure between suitable dies, one or both of which are provided with facets, some or all of which are provided with infinitesimal lines.

My invention therefore consists of a stone or body having its surface composed of facets and one or more of said facets being provided with lines equidistant, of uniform thickness relative to each other, and of sufficient number to the inch to produce iridescence, substantially as will be described.

Figure 1:
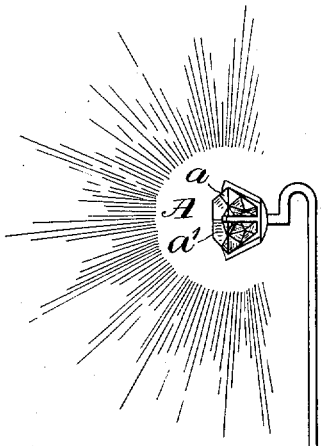
Figure 2:
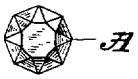
Figure 3:
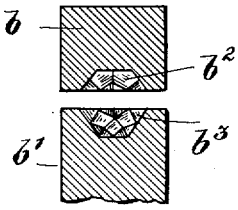

Figure 1 is a side elevation of a pin provided with a stone or jewel embodying my invention; Fig. 2, a side elevation, looking toward the left, of the stone or jewel shown in Fig. 1 with the setting omitted; Fig. 3, a longitudinal section of a set of dies with which the stone shown in Fig. 1 may be made, and Fig. 4 a longitudinal section of a modified form of die to be referred to.

My improved body or article A (shown in Fig. 1) is provided with facets $a$, some or all of which, in accordance with my invention, are provided with very fine or substantially infinitesimal lines $a'$, equidistant, of uniform thickness relative to each other, and of sufficient number to the inch to produce the iridescent effect of colors of the finer qualities of the diamond. The lines $a'$, which are herein shown on an exaggerated scale to enable my invention to be more readily comprehended, may run parallel or at an angle to one another.

The body A may and preferably will be composed of glass or like vitreous transparent material, and in practice may be made by means of suitable dies $b\,b'$. (Shown in Fig. 3.)

The dies $b\,b'$ may and preferably will be made of nickel, steel, or other suitable material, and one or both of the said dies will be provided with facets $b^2$, and some or all of the said facets will be provided with substantially infinitesimally fine lines represented by $b^3$. The finer the lines and the greater number to a given surface—as, for instance, the square inch—the more intense the iridescent effect produced on the stone or body A.

When the stone or body A is composed of glass, paste, or like material, the said material in a plastic state is subjected to pressure between the dies $b\,b'$, and the rough edge formed between the dies may be ground or otherwise smoothed off. The glass or other body A has thus imparted to it a faceted surface, with some or all of its facets provided with infinitesimal lines, by which iridesence is produced.

Figure 4:
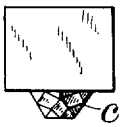

The dies $b\,b'$ may be made by means of a suitably-shaped die $c$, substantially such as shown in Fig. 4, the die $c$ being first cut with facets and then ruled or lined, and when thus formed the dies $b\,b'$ may be made or shaped by stamping them out with the die $c$.

I have thus far described my improved body or stone as composed of glass, paste, or like material; but it is evident that the inferior qualities of the diamond may be greatly improved by providing some or all of its facets with lines, which in this case may be effected by ruling the lines on the facets individually.

The intensity of the color on the faceted surface may be regulated by varying the number of lines to a given surface, as to the inch.

I claim—

As a new article of manufacture, the here-in-described stone or body having its surface composed of facets, and one or more of said facets being provided with lines equidistant, of uniform thickness, and of sufficient number to the inch to produce iridescence, substantially as described.

In testimony whereof I have signed my name to this specification in the presence of two subscribing witnesses.

JOHN JACOBSON.

Witnesses:

JAS. H. CHURCHILL,

S. C. FEARING.